United States Patent [19]
Gros

[11] Patent Number: 6,131,982
[45] Date of Patent: Oct. 17, 2000

[54] CLOSET CAB GUARD

[76] Inventor: Eugene W. Gros, 6241 Crater Lake Hwy., Central Point, Oreg. 97502

[21] Appl. No.: 09/369,671

[22] Filed: Aug. 5, 1999

[51] Int. Cl.⁷ .................................................. B60R 9/06
[52] U.S. Cl. .......................................... 296/37.6; 280/748
[58] Field of Search ............................. 296/37.6; 280/748

[56] References Cited

U.S. PATENT DOCUMENTS

| | | | |
|---|---|---|---|
| D. 381,306 | 7/1997 | Sauerwein | D12/190 |
| 3,049,363 | 8/1962 | Marx . | |
| 4,611,824 | 9/1986 | Mcintosh | 280/748 |

OTHER PUBLICATIONS

Pro Tech catalog, Feb. 1999.
T.L. Woods brohure.
Merrit catalog, 1997.

*Primary Examiner*—Dennis H. Pedder
*Assistant Examiner*—Mickki D. Murray

[57] ABSTRACT

The closet cab guard is a new invention. The main difference between this new invention and prior inventions of like cab guards is that the closet cab guard features a rain hood which opens both up and out, this provides protection from the weather while putting away gear and also allows for storage. The design and ornamental appearance of the invention is unique and clearly entitled to patent protection.

1 Claim, 6 Drawing Sheets

CLOSET CAB GUARD

CROSS-REFERENCE TO RELATED APPLICATIONS

Not Applicable

STATEMENT REGARDING FEDERALLY SPONSORES RESEARCH OR DEVELOPMENT

Not Applicable

REFERENCE TO A MICROFICHE APPENDIX

Not Applicable

BACKGROUND OF THE INVENTION

Basically, the invention consists of a structure which is mounted rearwardly of a semi truck cab to serve as a safety device or guard to prevent damage to the cab and possible injury to the driver due to shifting cargo. The Closet Cab Guard also allows room for storage. If you open the single lift door you then get a rain hood to keep dry while putting away the gear. This unique ornamental design not only prevents damage to the cab and driver but also allows a storage area that when opened protects the driver from the weather. This solves the problem of getting wet and cold while putting away gear.

In accordance with my statutory duty of disclosure, copies of brochures depicting cab guards presently being made and sold are enclosed. Also enclosed are ten black line drawings of the Closet Cab Guard containing all possible views.

BRIEF SUMMARY OF THE INVENTION

As mentioned earlier the Closet Model Cab Guard invention consists of a structure which is mounted rearwardly of a truck cab to serve as a safety device or guard to prevent damage to the cab and possible injury to the driver due to shifting cargo. The Closet Cab Guard has many advantages over existing cab guards. The first and most obvious difference is that it has a rain hood to protect drivers from the elements. Opening the single lift door accesses the rain hood. Before this invention truck drivers may have been exposed to the elements while putting away their gear. The Closet Cab Guard also comes equipped with shelving and storage compartment dividers.

DETAILED DESCRIPTION OF THE INVENTION

For the purpose of promoting an understanding of the principles of the invention reference will now be made to the drawings and specific language will be used to describe the same. It will nevertheless be understood that no limitation of the scope of the invention is thereby intended.

Figure 1:
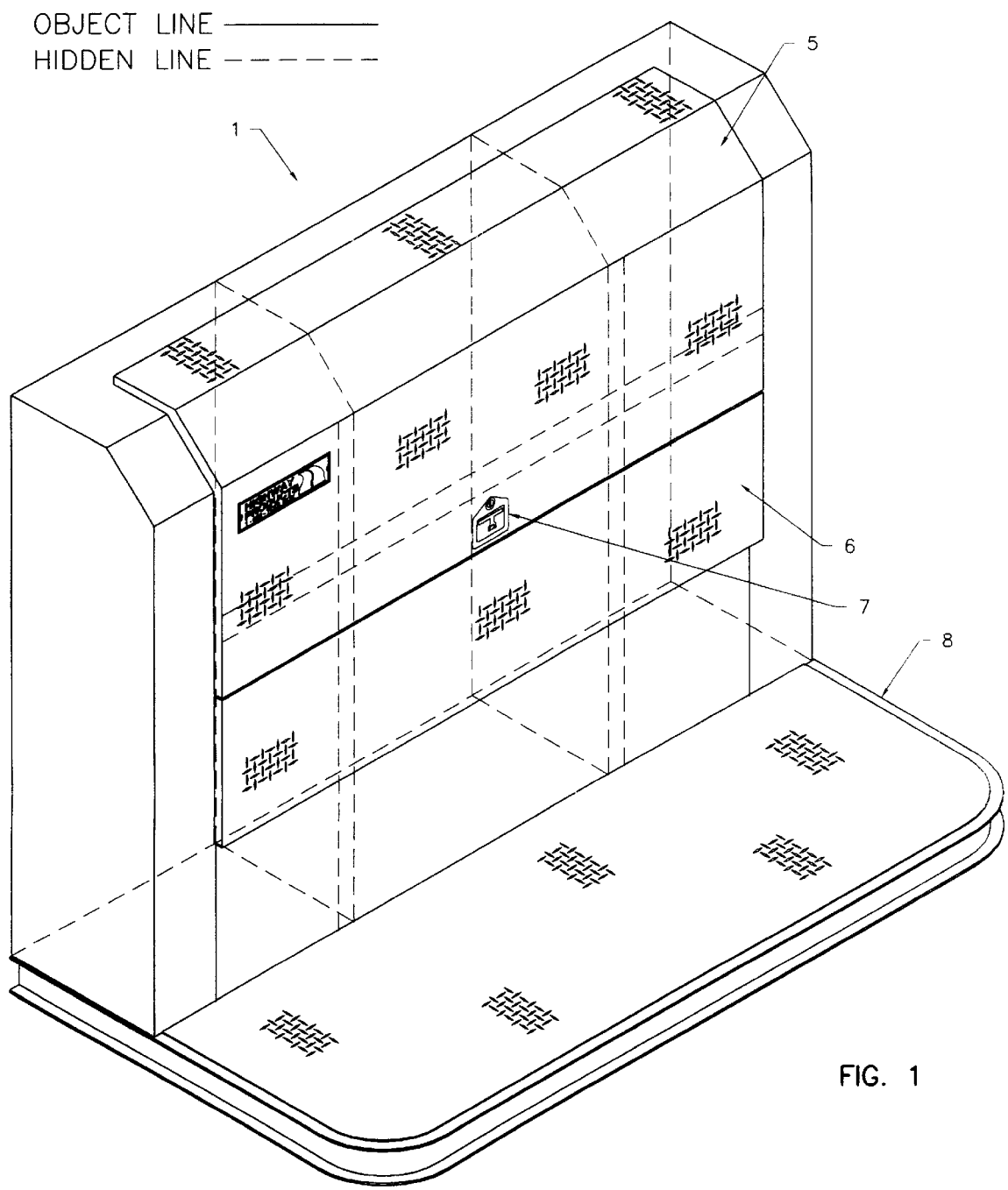
FIG. 1—Is a perspective view of the closet cab guard with the doors closed.
Figure 10:
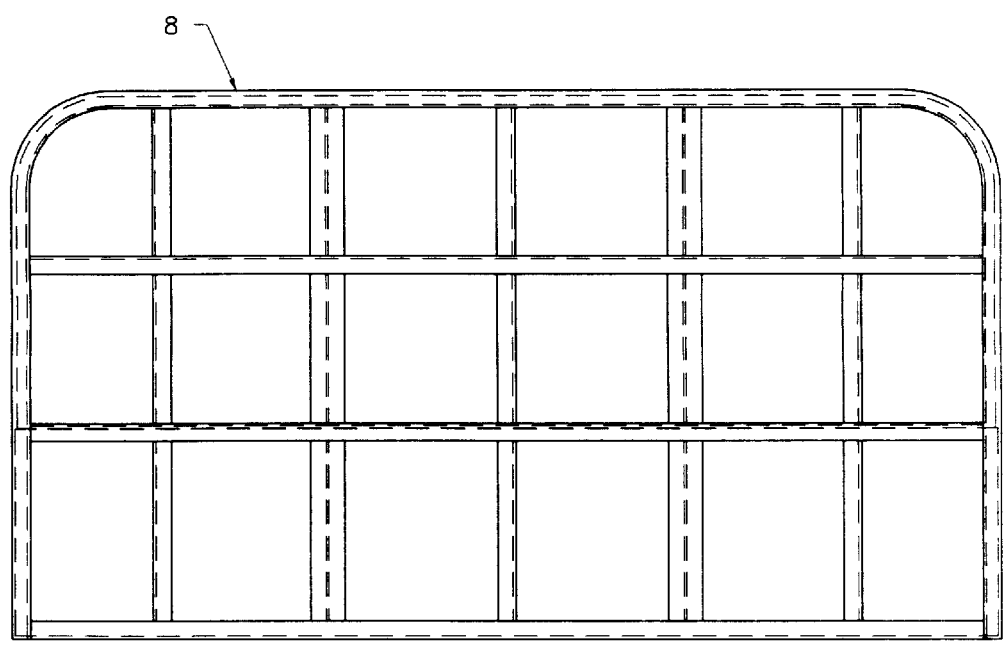
FIG. 10—Bottom view of the closet cab guard.

The cab guard 1 of the present invention is for mounting on the backside of a motor vehicle cab (not shown) to protect the driver against a forwardly shifting load or cargo. Referring initially to FIG. 1, cab guard 1 is illustrated showing the doors closed. The cab guard 1 includes a storage area 2, swing up top door 5, bottom door 6, stainless steel T-handle locking mechanism 7, and deck frame 8. The deck frame 8 is attached to the storage area 2 by being welded together. The bottom view of the deck frame 8 is shown in FIG. 10.

Figure 2:
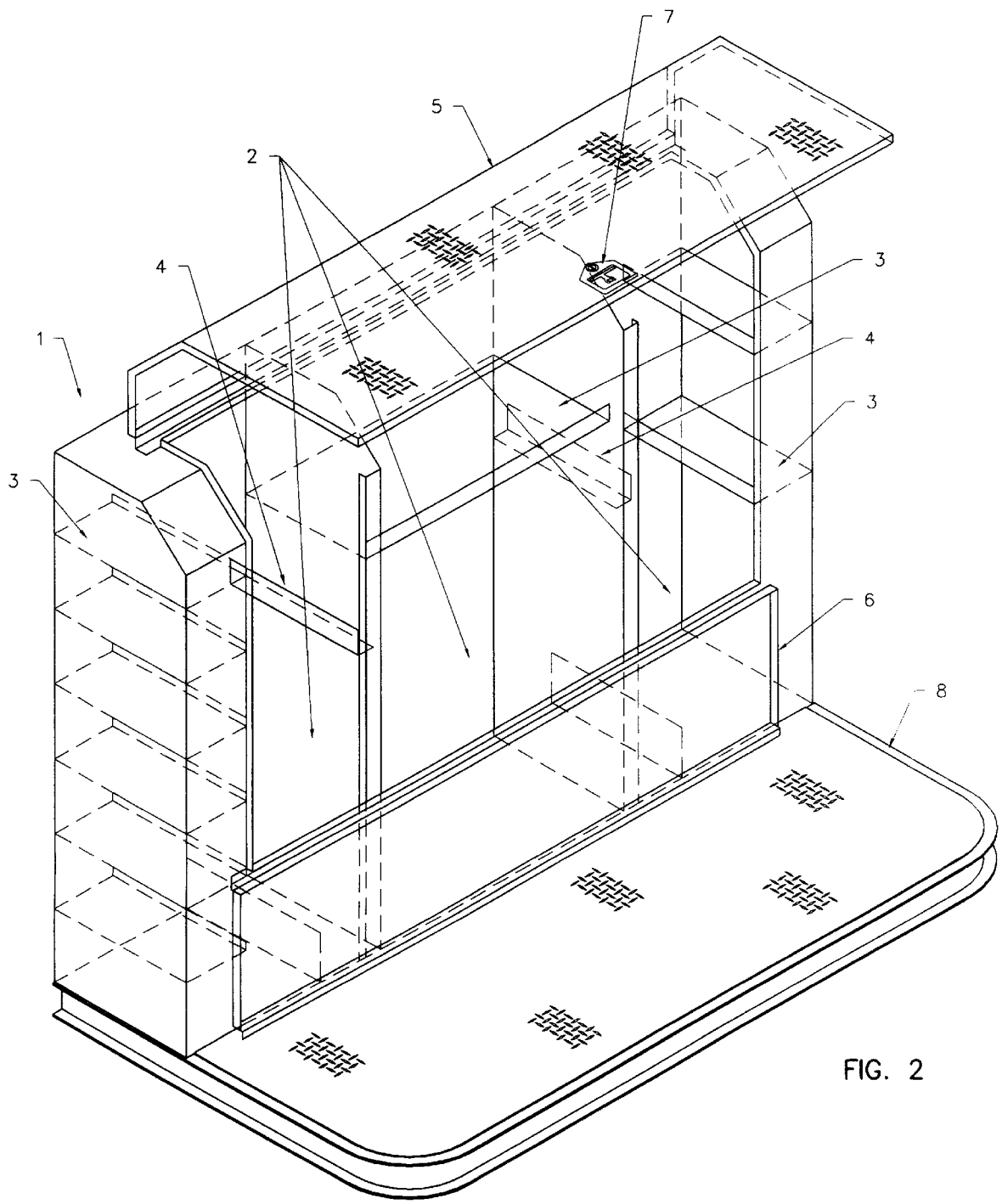
FIG. 2—Is a perspective view of the closet cab guard with the doors open and shelving shown.
Figure 3:
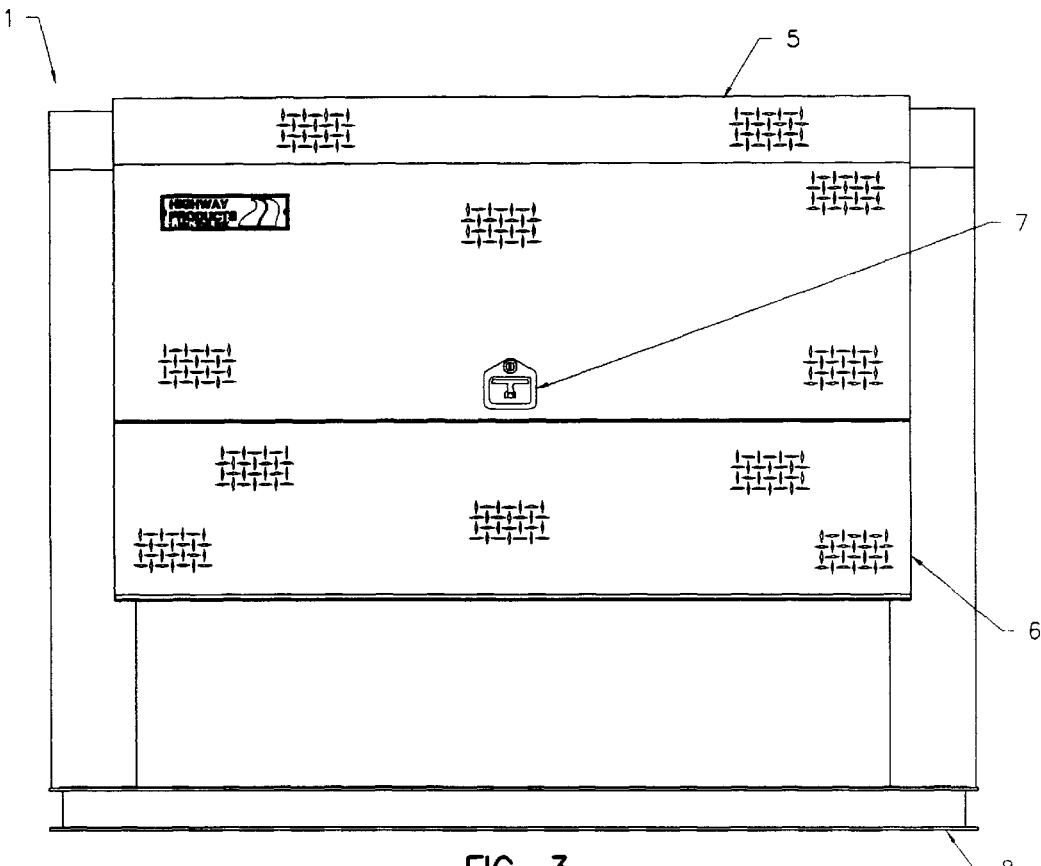
FIG. 3—Is a front elevation view of the closet cab guard with the doors closed.
Figure 4:
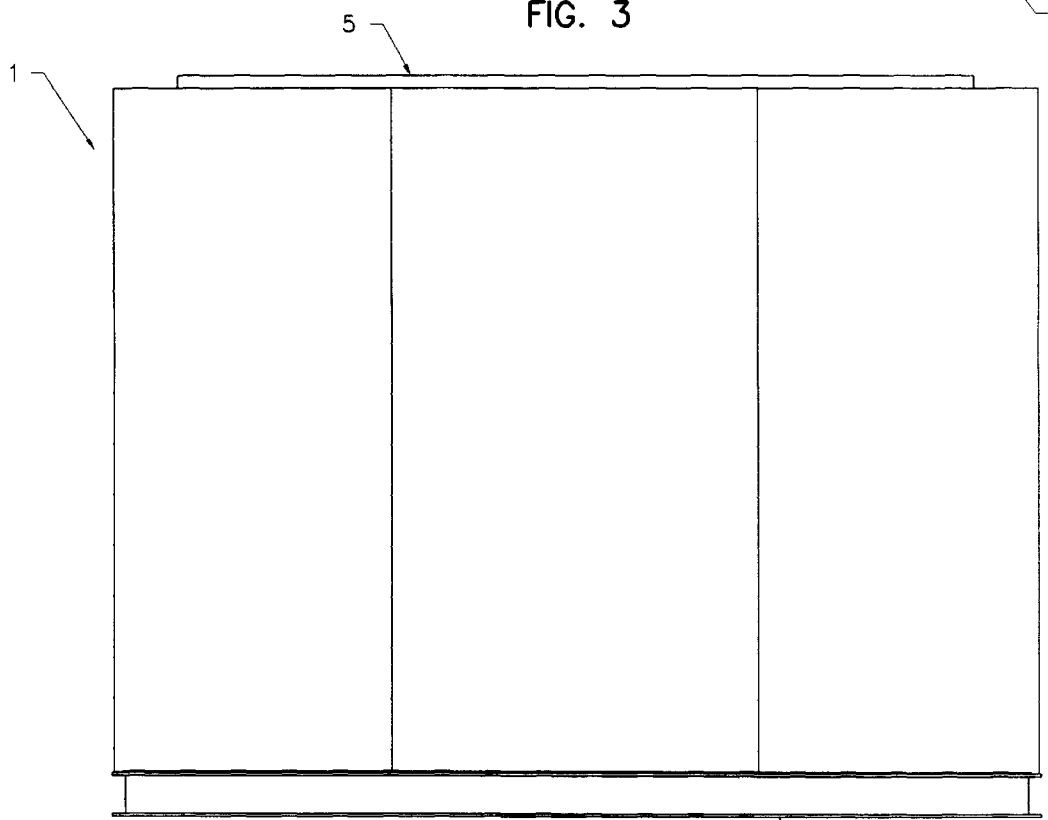
FIG. 4—Is a back elevation view of closet cab guard.
Figure 5:
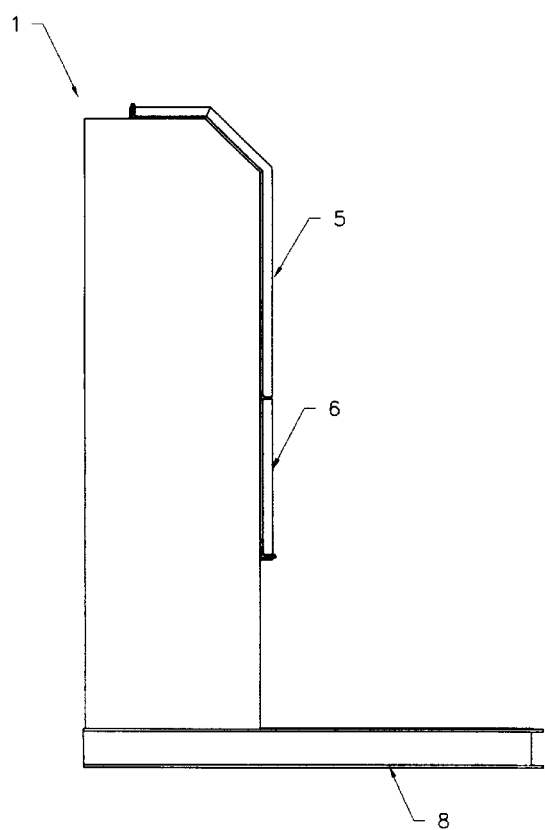
FIG. 5—Is a right side elevation view of the closet cab guard with the doors closed.
Figure 6:
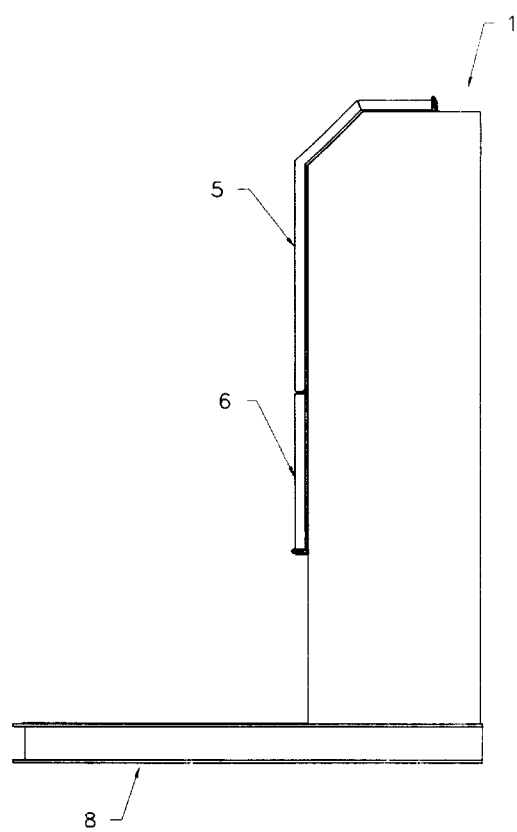
FIG. 6—Is a left side elevation view of the closet cab guard with the doors closed.
Figure 7:
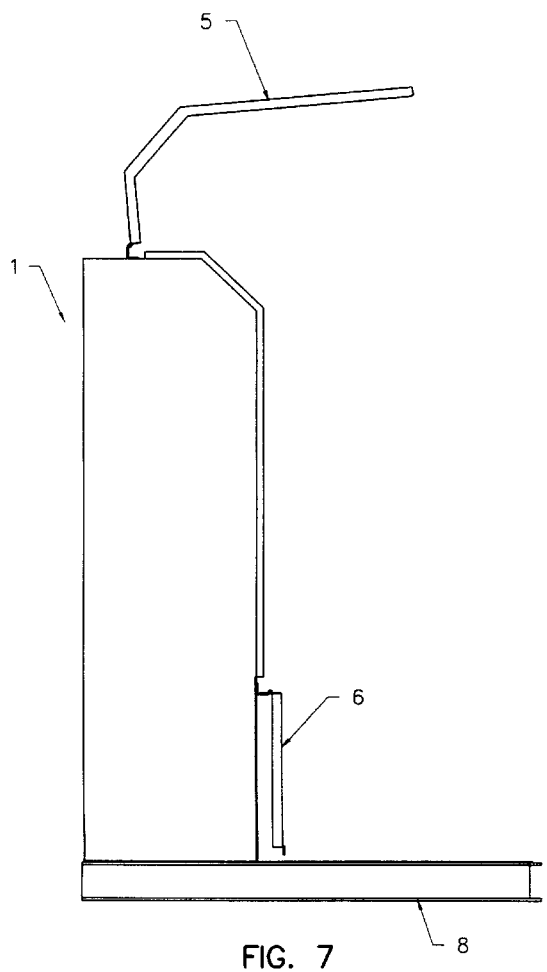
FIG. 7—Is a right side elevation view of the closet cab guard with the doors open.
Figure 8:
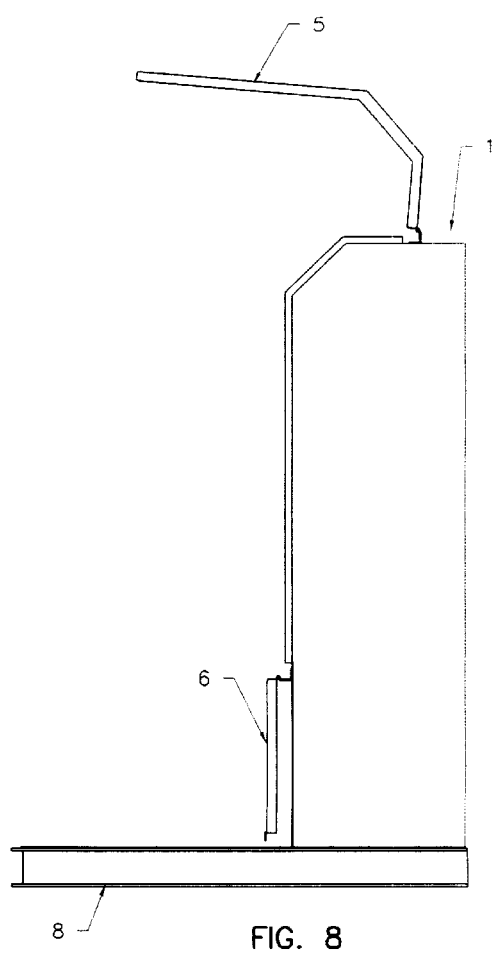
FIG. 8—Is a left side elevation view of the closet cab guard with the doors open.
Figure 9:
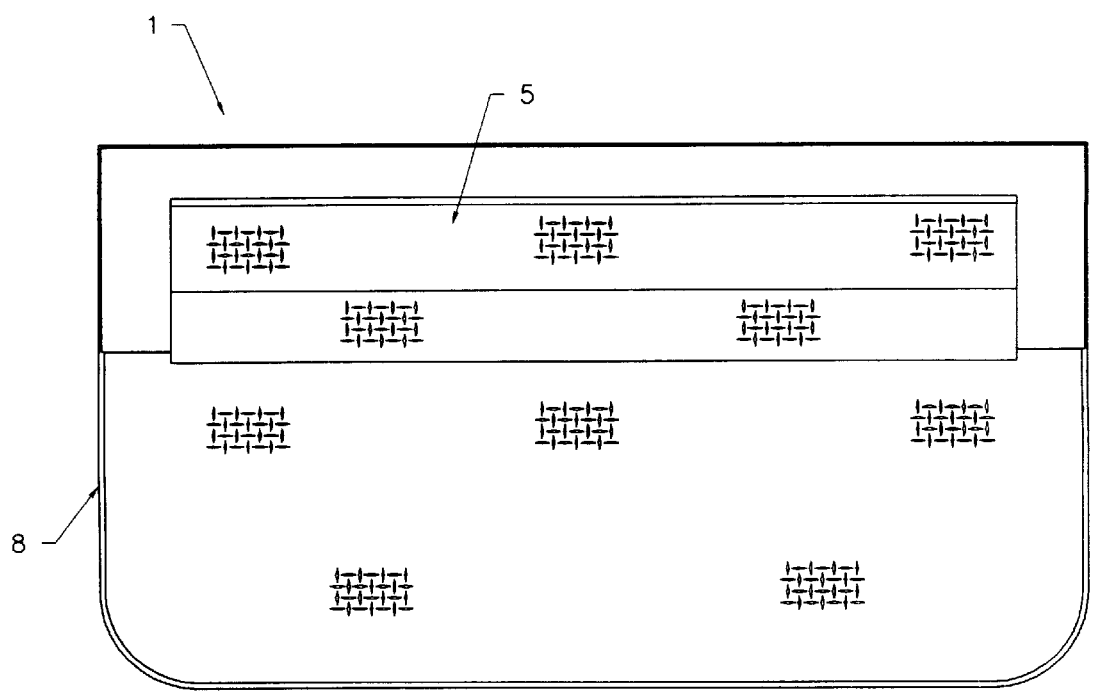
FIG. 9—Is a top plan view of the closet cab guard with the doors closed.

FIG. 2 illustrates the cab guard 1 with both the swing up top door 5, and the bottom door 6 open. The swing up top door 5 can be used as a rain hood to protect drivers from the elements when loading or unloading tools and equipment. FIG. 2 also shows the shelving 3 on both sides of the storage area 2 and the middle of the storage area 2. Six shelves 3 are located on the driver's side of the storage area 2 and two shelves 3 are located on the passenger's side with one larger shelf 3 located in the center of the storage area 2. There are also two chain hangers 4 shown in FIG. 2. The shelves 3 and the chain hangers 4 are attached to the storage area by welding.

While the invention has been illustrated and described in detail in the drawings and description it is not restrictive in character. It being understood that all changes and modifications that come within the spirit of the invention are desired to be protected.

What I claim as my invention is:

1. A cab guard for mounting on the backside of a motor vehicle cab, said cab guard being substantially rectangular in shape to cover a substantial portion of the back of the cab for protecting the driver against the hazard of forwardly shifting load, said cab guard comprising:

a storage area comprised of a plurality of shelves on both the driver's side and the passenger's side and center of the storage area, and a plurality of chain hangers;

a swing up top door and a bottom door that can be adjusted downward to allow maximum access to said storage area, said cab guard swing up top door can serve the purpose of a rain shield or rain hood when an operator is loading or unloading tools and equipment;

a stainless steel t-handle locking mechanism; and a deck frame on a lower portion of the cab guard to which the storage area is attached.

* * * * *